United States Patent
Podilchuk et al.

(10) Patent No.: US 10,311,570 B1
(45) Date of Patent: Jun. 4, 2019

(54) MEDICAL IMAGE BASED DISTORTION CORRECTION MECHANISM

(71) Applicants: Christine I. Podilchuk, Warren, NJ (US); Richard Mammone, Warrem, NJ (US)

(72) Inventors: Christine I. Podilchuk, Warren, NJ (US); Richard Mammone, Warrem, NJ (US)

(73) Assignee: SONAVISTA, INC., Warren, NJ (US)

( * ) Notice: Subject to any disclaimer, the term of this patent is extended or adjusted under 35 U.S.C. 154(b) by 0 days.

(21) Appl. No.: 16/213,201

(22) Filed: Dec. 7, 2018

(51) Int. Cl.
*G06K 9/00* (2006.01)
*G06T 7/00* (2017.01)
*G06K 9/62* (2006.01)
*G06K 9/32* (2006.01)

(52) U.S. Cl.
CPC ........... *G06T 7/0014* (2013.01); *G06K 9/32* (2013.01); *G06K 9/6202* (2013.01); *G06T 2207/20084* (2013.01); *G06T 2207/30168* (2013.01)

(58) Field of Classification Search
CPC . G06T 2207/30168; G06T 2207/20084; G06T 7/0014; G06K 9/32; G06K 9/6202
See application file for complete search history.

(56) References Cited

U.S. PATENT DOCUMENTS

| | | | | |
|---|---|---|---|---|
| 6,646,760 B1 * | 11/2003 | Hanihara | ................ | G06T 5/006 358/1.9 |
| 8,023,766 B1 * | 9/2011 | Bergman | ................. | G06K 9/34 358/3.26 |
| 8,731,336 B2 * | 5/2014 | Reese | .................. | G06K 9/3275 382/275 |
| 2006/0074727 A1 * | 4/2006 | Briere | ................ | G06Q 10/0631 705/7.12 |
| 2006/0140442 A1 * | 6/2006 | ElRayess | .............. | G06T 1/0028 382/100 |
| 2013/0028488 A1 * | 1/2013 | Abe | ..................... | G06K 9/0008 382/115 |

(Continued)

OTHER PUBLICATIONS

Chi et al., ("Single image Reflection Removal Using Deep Encoder-Decoder Network", Jan. 31, 2018, pp. 1-10), (Year: 2018).*

(Continued)

*Primary Examiner* — Amara Abdi
(74) *Attorney, Agent, or Firm* — Gearhart Law, LLC (57) ABSTRACT

A mobile device to provide a medical image based distortion correction mechanism is described. An image analysis application, executed by the mobile device, captures a digital copy of the medical image with a camera component in response to a user action. Distortion(s) associated with the digital copy are identified by processing the digital copy with deep neural network (DNN) model(s). Next, a manual correction description is determined to correct the distortion(s) in relation to the camera component and the medical image. Furthermore, a notification to recapture the digital copy is provided to the user. The notification includes the manual correction description. Additionally, in response to another user action to correct the distortion(s) or a failure to detect the user execute manual correction(s) associated with the distortion(s) within a time period, the distortion(s) within the digital copy are corrected and the corrected digital copy is provided to the user.

12 Claims, 5 Drawing Sheets

(56) References Cited

U.S. PATENT DOCUMENTS

| | | | |
|---|---|---|---|
| 2015/0123985 A1* | 5/2015 | Abe | G06T 5/008 |
| | | | 345/590 |
| 2016/0093048 A1* | 3/2016 | Cheng | G06K 9/6289 |
| | | | 382/131 |
| 2017/0359489 A1* | 12/2017 | Lopez | H04N 1/46 |
| 2017/0372193 A1* | 12/2017 | Mailhe | G06N 3/02 |

OTHER PUBLICATIONS

Yan et al., ("Automatic Photo Adjustment Using Deep Neural Networks", May 16, 2015, pp. 1-15) (Year: 2015).*
Alex Kendall and Roberto Cipolia, ("Geometric loss functions for camera pose regression with deep learning", CVPR 2017, pp. 1-10) (Year: 2017).*
Alex Kendall and Roberto Cipolla, "Geometric loss functions for camera pose regression with deep learning", CVPR 2017, 10 pages.
Chi et al., "Single Image Reflection Removal Using Deep Encoder-Decoder Network", Jan. 31, 2018, 10 pages.
Yan et al., "Automatic Photo Adjustment Using Deep Neural Networks", May 16, 2015, 15 pages.

* cited by examiner

MEDICAL IMAGE BASED DISTORTION CORRECTION MECHANISM

CLAIM OF PRIORITY

This application is a non-provisional application and claims no priority to any patent or patent application.

FIELD OF THE EMBODIMENTS

The field of the embodiments relate to a device to provide a medical image based distortion correction mechanism. The correction mechanism may determine and provide manual correction descriptions associated with distortions within a digital copy of the medical image before correcting the distortions to provide an enhanced image as output. The distortions relate to a capture process of the digital image.

BACKGROUND OF THE EMBODIMENTS

Information exchanges have changed processes associated with work and personal environments. Automation and improvements in processes have expanded the scope of capabilities offered for personal and business data consumption. With the development of faster and smaller electronics, a variety of mobile devices have integrated into daily lives. A modern mobile device includes components to provide variety of services such as communication, display, imaging, voice, and/or data capture, among others. Abilities of the modern mobile device jump exponentially when networked to other resources that provide previously unimagined number of services associated with medical imaging.

Ultrasound and other medical imaging devices scan biological structures or tissues of a patient to provide images. The scanned images are provided to medical practitioner(s) to aid with diagnosis of illnesses such as cancer. Clarity and quality of scanned image are usually suspect and depend on variety of conditions associated with the patient and a skill of a technician capturing the scanned image. Furthermore, the medical practitioner is also subject to missed diagnosis or false diagnosis associated with the scanned image due to quality of the scanned image and/or human error.

SUMMARY OF THE EMBODIMENTS

The present invention and its embodiments relate to a mobile device to provide a medical image based distortion correction mechanism. In an example scenario, the mobile device may be configured to capture a digital copy of the medical image with a camera component in response to a user action. The medical image may be displayed by a display device. Distortion(s) associated with the digital copy may be identified by processing the digital copy with deep neural network (DNN) model(s). A manual correction description may be determined to correct the distortion(s) in relation to the camera component and the medical image. Next, a notification to recapture the digital copy may be provided to a user. The Correction DNN model(s) may also automatically correct the degradation. The notification may include the manual correction description. Additionally, in response to another user action to correct the distortion(s) or a failure to detect the user execute manual correction(s) associated with the distortion(s) within a time period, the distortion(s) within the digital copy may be corrected and the corrected digital copy may be provided to the user.

In another embodiment of the present invention, a mobile device for providing a medical image based distortion correction mechanism is described. The mobile device may include a camera component configured to capture a digital copy of the medical image in relation to the image analysis application. The mobile device may also include a memory configured to store instructions associated with the image analysis application. Furthermore, the mobile device may include a processor coupled to the camera component and the memory. The processor may execute the instructions associated with the image analysis application. The image analysis application may include an image analysis module. The image analysis module may be configured to capture the digital copy of the medical image with the camera component in response to a user action. The medical image may be displayed by a display device. An input image set of DNN model(s) comparable to the digital copy may be determined. The DNN model(s) may include an output image set correlated to the input image set. Next, variance(s) between the output image set and the digital copy may be determined. The variance(s) may be designated as distortion(s). A manual correction description may also be determined to correct the distortion(s) in relation to the camera component and the medical image. A notification to recapture the digital copy may be provided to a user. The notification may include the manual correction description. Additionally, in response to another user action to correct the distortion(s) or a failure to detect the user execute manual correction(s) associated with the distortion(s) within a time period, the distortion(s) within the digital copy may be corrected and the corrected digital copy may be provided to the user.

In yet another embodiment of the present invention, a method of providing a medical image based distortion correction mechanism is described. The method includes capturing a digital copy of the medical image with a camera component. The medical image may be displayed by a display device. Next, an input image set of DNN model(s) comparable to the digital copy may be determined. The DNN model(s) may include an output image set correlated to the input image set. Variance(s) between the output image set and the digital copy may also be determined. The variance(s) may be designated as a measure of each type of distortion(s) or the total distortion. A manual correction description to correct the distortion(s) in relation to the camera component and the medical image may be determined. A notification to recapture the digital copy may next be provided to the user. The notification may include the manual correction description. Additionally, in response to a user action to correct the distortion(s) or a failure to detect the user execute manual correction(s) associated with the distortion(s) within a time period, the distortion(s) within the digital copy may be corrected and the corrected digital copy may be provided to the user.

It is an object of the embodiments of the present invention to determine an input image set of DNN model(s) comparable to a digital copy of a medical image.

It is an object of the embodiments of the present invention to identify variance(s) between an output image set (correlated to the input set) and the digital copy.

It is an object of the embodiments of the present invention to designate the variance(s) as distortion(s) within the digital copy.

It is an object of the embodiments of the present invention to determine manual correction description associated with the distortion(s).

It is an object of the embodiments of the present invention to provide the manual correction description to a user along with a suggestion to recapture the digital copy.

These and other features, aspects and advantages of the present invention will become better understood with reference to the following drawings, description and claims.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations may be made thereto.

Figure 1:
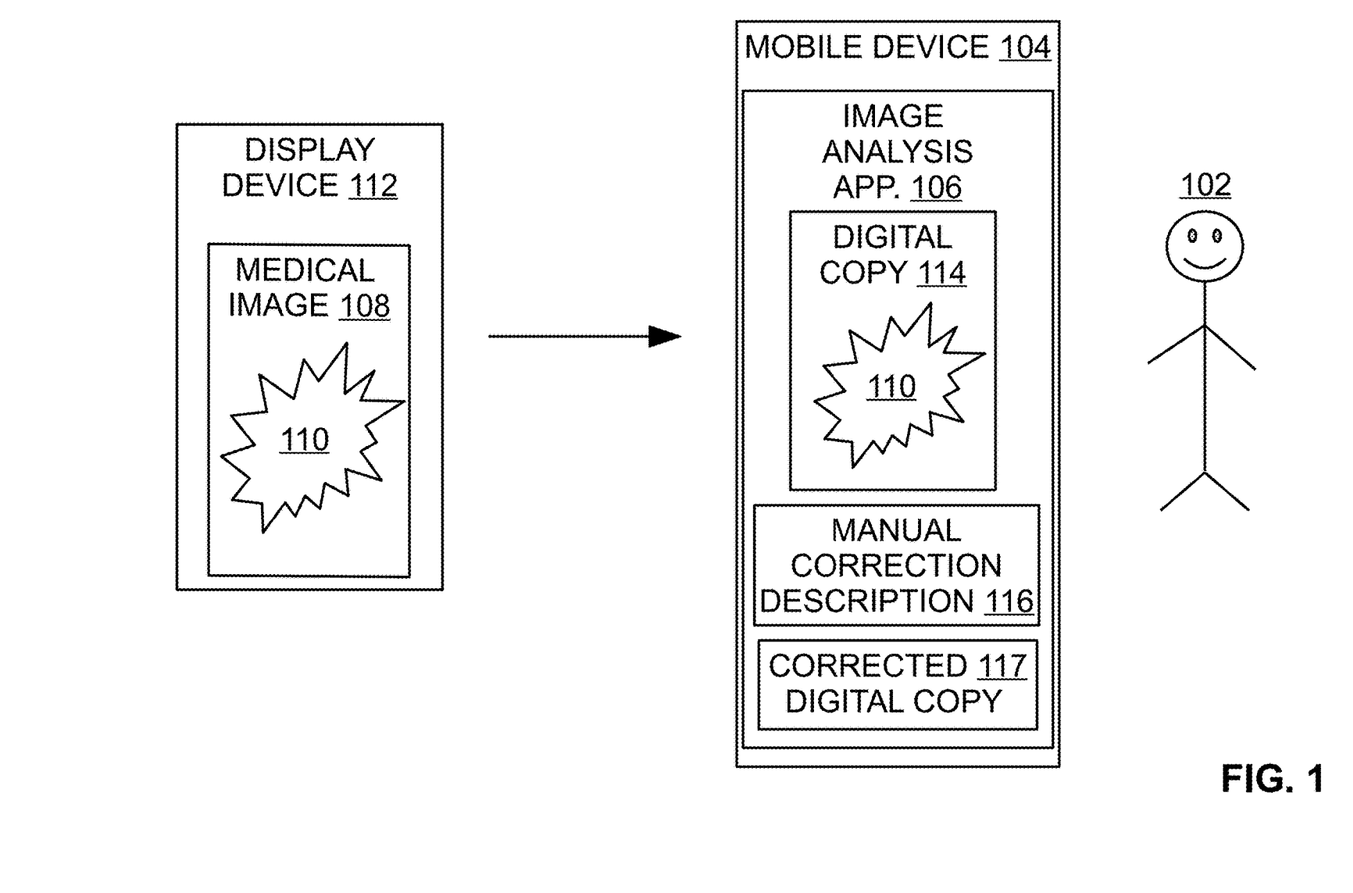
FIG. 1 shows a conceptual diagram illustrating examples of providing a medical image based distortion correction mechanism, according to an embodiment of the invention.

FIG. 1 shows a conceptual diagram illustrating examples of providing a medical image based distortion correction mechanism. In an example scenario, a mobile device 104 may execute (or provide) an image analysis application 106. The mobile device 104 may include a physical computing device hosting and/or providing features associated with a client application (such as the image analysis application 106). The mobile device 104 may include and/or is part of a smart phone, a tablet based device, and/or a laptop computer, among others. The mobile device 104 may also be a node of a network. The network may also include other nodes such as a display device 112, among others. The network may connect nodes with wired and wireless infrastructure.

The mobile device 104 may execute the image analysis application 106. In an example scenario, the image analysis application 106 may capture a digital copy 114 of a medical image 108 in response to a user action. An example of the medical image 108 may include an ultrasound image (or scan). Other examples of the medical image 108 may include a x-ray image, a magnetic resonance imaging (MRI) scan, a computed tomography (CT) scan, and/or a positron emission tomography (PET) scan, among others. The display device 112 may include a monitor and/or a display component associated with a medical imaging device/system that captures, manages, and/or presents the medical image 108 to a user 102. The user 102 may include a medical practitioner such as a doctor, a nurse, and/or a technician, a patient, and/or an administrator, among others. The user 102 may use the medical image 108 to diagnose an issue, a malignancy (cancer), and/or other illness associated with a patient.

The medical image 108 may include a region of interest (ROI) 110. The ROI 110 may include a biological structure of a patient. For example, the ROI 110 may include a malignant or a benign tumor. Alternatively, the ROI 110 may represent another structure associated with an organ and/or other part of the patient. The digital copy 114 may be used for downstream processing of the ROI 110 by the mobile device 104. As such, the digital copy 114 may be expected to preserve a look and feel of the ROI 110 within the medical image 108. The downstream processing may include artificial intelligence based mechanisms that identify and diagnose the ROI 110 and provide a diagnostic aid to the user in identifying whether the ROI 110 is a malignant tissue or a benign tissue. As such, the digital copy 114 may need to preserve the ROI 110 and capture a sufficient detail associated with the ROI 110 to allow the downstream processing to successfully classify the ROI 110.

The image analysis application 106 may next identify distortion(s) associated with the digital copy by processing the digital copy 114 with deep neural network(s) (DNN) models. A distortion may include an error resulting from a process to capture the digital copy 114 from the medical image 108 using a camera component associated with the mobile device 104. In addition, a DNN model may include an artificial neural network created with training input and output sets. The DNN model may identify a correct mathematical mechanism that turns the training input set into the training output set.

In an example scenario, the image analysis application 106 may process the digital copy 114 with a DNN model to detect a distortion associated with the DNN model. Multiple DNN models may be used to process the digital copy 114 to detect a variety of distortions (within the digital copy 114).

Next, a manual correction description 116 to correct the distortion(s) may be determined. The manual correction description 116 may describe a user action to adjust an attribute of the camera component and/or the medical image 108, among other attributes/factors associated with the process to recapture the digital copy 114.

A notification to recapture the digital copy 114 may next be provided to the user 102. The notification may include the manual correction description 116. The manual correction description 116 may prompt the user 102 to adjust attribute(s) associated with the camera component, the display device 112, and/or an environment (that encompasses the display device 112 and the camera component), among others things. Adjustments to the attribute(s) may prevent or minimize the distortion(s) while recapturing the digital copy 114.

In another example scenario, another user action to correct the distortion(s) or a failure by the user 102 to execute manual correction(s) associated with the distortion(s) within a time period may be detected. An example of the time period may include 1 minute. The time period may be adjustable by the user 102. In response to the user action or the failure, the distortion(s) may be automatically corrected within the digital copy 114. Furthermore, a corrected digital copy 117 may next be provided to the user.

Previous example(s) to provide a medical image based distortion correction mechanism are not provided in a limiting sense. Alternatively, the image analysis application 106 may perform operations associated with providing the manual correction description 116 as a desktop application, a workstation application, and/or a server application, among others. The image analysis application 106 may also be a client interface of a server based application.

The user 102 may interact with the image analysis application 106 with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the mobile device 104, the image analysis application 106, embodiments are not limited to these components or system configurations and can be implemented with other system configuration employing fewer or additional components.

Figure 2:
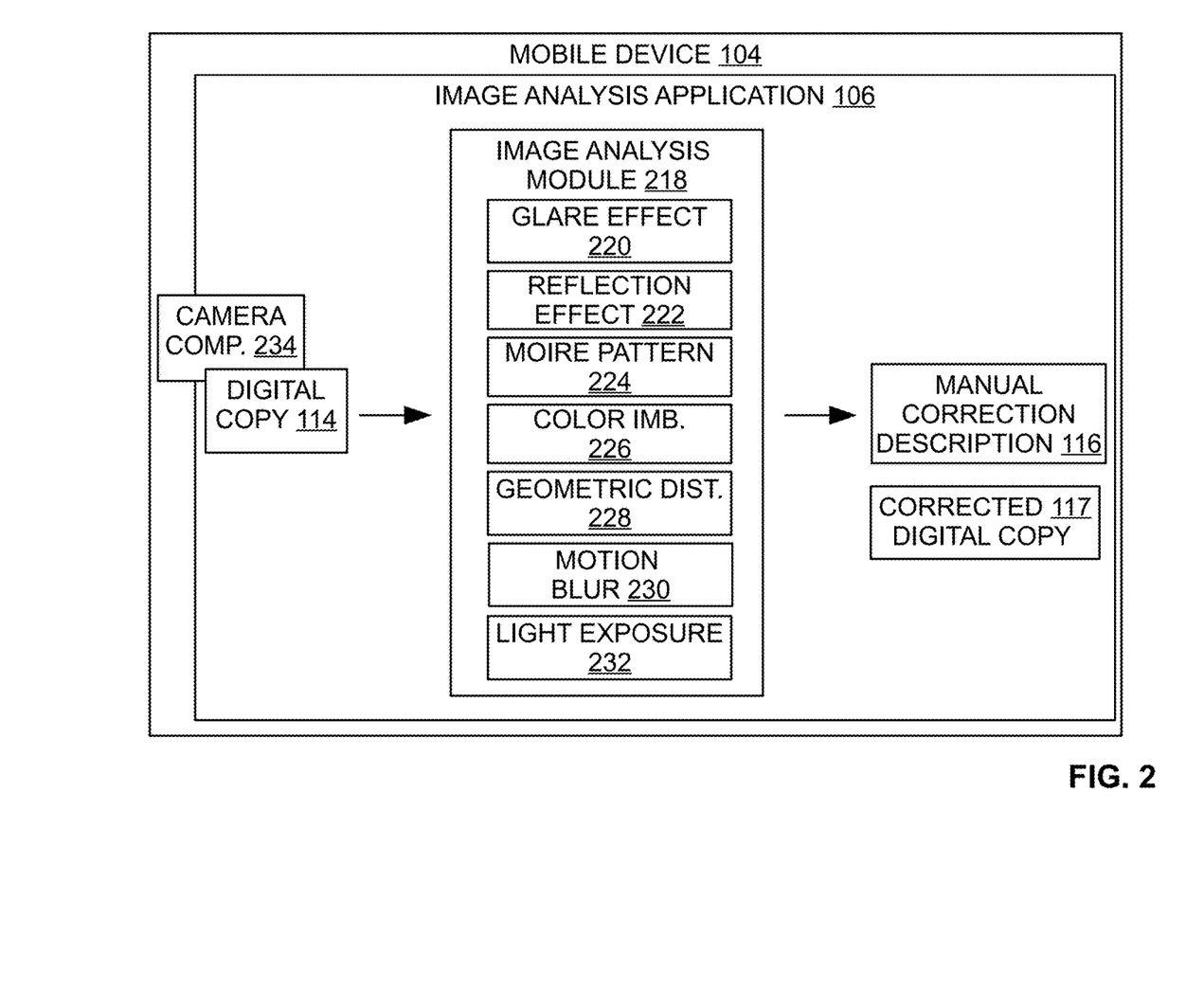
FIG. 2 shows a display diagram illustrating components of an image analysis application detecting distortions in a digital copy of a medical image, according to an embodiment of the invention.

FIG. 2 shows a display diagram illustrating components of the image analysis application 106 detecting distortion(s) in the digital copy 114 of a medical image. The image analysis application 106 may be executed by the mobile device 104. In an example scenario, an image analysis module 218 of the image analysis application 106 may capture the digital copy 114 of the medical image using a camera component 234. The medical image may be displayed by a display device. As a result of the capture process, distortion(s) may be introduced to the digital copy 114. Examples of the distortion(s) may include a glare effect 220, a reflection effect 222, a moiré pattern 224, a color imbalance, a geometric distortion 228, a motion blur 230, and/or a light exposure 232, among others.

The glare effect 220 and/or the reflection effect 222 may result from lighting associated with an environment, the display device, and/or the camera component 234. The moiré pattern 224 may include round patterns within the digital copy 114 resulting from a process to capture the digital copy 114 of the medical image from the display device. A color imbalance 226 may produce a rainbow or a rippling of color on the digital copy 114. The geometric distortion 228 may be caused by an off axis capture of the digital copy 114.

The motion blur 230 may be a movement of an organ and/or the medical imaging device while capturing the medical image. In addition, the motion blur 230 may be caused by a patient movement during the image acquisition process. Alternatively, the motion blur 230 may be caused by shaking of a hand of the user capturing the digital copy 114. The image analysis module 218 may also detect a noise related issue and/or the light exposure 232 issue as a distortion within the digital copy 114.

In an example scenario, the image analysis module 218 may determine an input image set associated with a DNN model. The DNN model may be associated with a distortion. The input image set may be comparable to the digital copy 114. For example, the input image set may include images that are similar to the digital copy 114 (with an ROI). The DNN model may also include an output image set correlated to the input image set. The output image set may include distortion correction(s) applied to the input image set. As such, a variance between the digital copy 114 and the output image set may determine whether a distortion exists within the digital copy 114.

Next, a variance between the output image set and the digital copy 114 may be determined. The variance may be designated as the distortion associated with the digital copy 114. An example of the DNN model may include input and output input sets associated with a distortion such as the glare effect 220, the reflection effect 222, the moiré pattern 224, the color imbalance 226, the geometric distortion 228, the motion blur 230, the light exposure 232, and/or the noise, among others.

In an example scenario, the image analysis module 218 may identify the glare effect 220 within the digital copy 114 as a distortion. Next, the manual correction description 116 associated with the glare effect may be determined. The manual correction description 116 may include a suggestion to move the camera component 234 in relation to the display device to remove or minimize the glare effect 220.

In another example scenario, the reflection effect 222 within the digital copy 114 may be identified as a distortion. Next, the manual correction description 116 associated with the reflection effect 222 may also be determined. The manual correction description 116 may include the suggestion to move the camera component 234 closer or away from the display device to remove or minimize the reflection effect 222.

In yet another example scenario, the moiré pattern 224 may be identified within the digital copy 114 as a distortion. Next, the manual correction description 116 associated with the moiré pattern 224 may be determined. The manual correction description 116 may include a suggestion to adjust a focus associated with the camera component 234.

In yet another example scenario, the color imbalance 226 may be identified within the digital copy 114 as a distortion. Next, the manual correction description 116 associated with the color imbalance 226 may be determined. The manual correction description 116 may include a suggestion to adjust color control(s) associated with the camera component 234.

In yet another example scenario, the geometric distortion 228 may be identified within the digital copy 114 as a distortion. Next, the manual correction description 116 associated with the geometric distortion 228 may be determined. The manual correction description 116 may include a suggestion to adjust a focus associated with the camera component 234.

In yet another example scenario, the motion blur may be identified within the digital copy 114 as a distortion. The manual correction description 116 associated with the motion blur 230 may be determined. The manual correction description 116 may include a suggestion to steady a grip on the camera component 234 while recapturing the digital copy 114.

In yet another example scenario, the light exposure 232 may be identified within the digital copy 114 as a distortion. The manual correction description 116 associated with the light exposure 232 may be determined. The manual correction description 116 may include a suggestion to a lighting associated with the camera component 234, the display device, and/or an environment while recapturing the digital copy 114.

A notification to recapture the digital copy 114 may be provided to the user to prompt the user (to recapture the digital copy 114). The notification may include the manual correction description 116 to instruct the user on manual adjustment(s) associated with the camera component 234, the display device (displaying the medical image), and/or the environment. The instructions may impact to a process to recapture the digital copy 114.

Additionally, a failure by the user to execute manual correction(s) associated with the distortion(s) within a time period or a user action to correct the distortion(s) may be detected. In response to the failure, the distortion(s) may be automatically corrected within the digital copy 114. Furthermore, the corrected digital copy 117 may be provided to the user.

Figure 3:
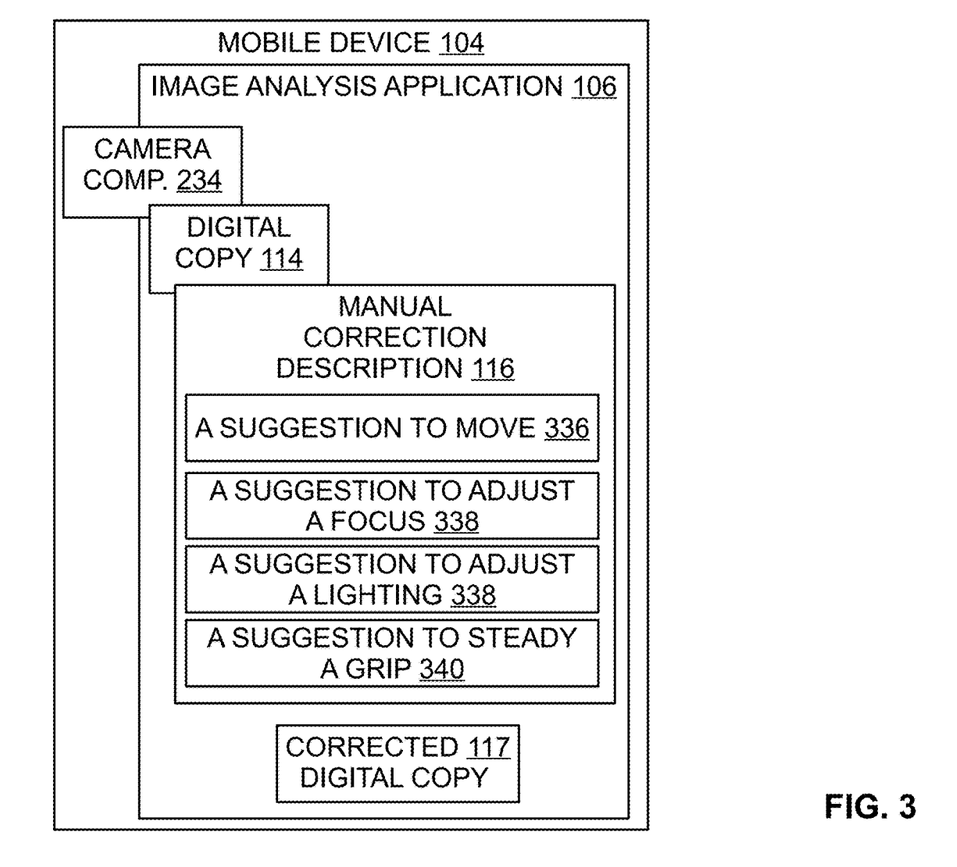
FIG. 3 shows another display diagram illustrating components of user interface providing a manual correction description to prompt a user to correct distortion(s) in a digital copy of a medical image, according to an embodiment of the invention.

FIG. 3 shows another display diagram illustrating components of a user interface providing a manual correction description to prompt a user to correct distortion(s) in the digital copy 114 of the medical image. The image analysis application 106 may be executed by the mobile device 104. The image analysis application 106 may determine the manual correction description 116 upon processing the digital copy 114 with DNN model(s). Distortion(s) may be determined within the digital copy 114. Next, the image analysis application 106 may determine the manual correction description 116 to suggest to the user associated with a process to recapture the digital copy 114. The manual correction description 116 may prompt the user to adjust attributes associated with the camera component 234, a display device (displaying the medical image), and/or an environment associated with the process to recapture the digital copy 114.

An example of the manual correction description 116 may include the suggestion to move 336 the camera component 234. The distortion(s) may be corrected or minimized, while recapturing the digital copy 114, with a movement of the camera component 234 closer or further away from the display device, in a rotational movement changing an axis of capture, horizontally, and/or vertically in relation to the display device.

Similarly, the distortion(s) may be corrected or minimized, while recapturing the digital copy 114, with a suggestion to adjust a focus 338 of the camera component 234. A suggestion to adjust a lighting 340 (associated with the display device, the camera component 234, and/or an environment associated with the recapture process) may also correct or minimize the distortion(s) while recapturing the digital copy 114. Furthermore, a suggestion to steady a grip 342 may correct or minimize the distortion(s) such as a blur while recapturing the digital copy 114.

Furthermore, another user action to correct the distortion(s) or a failure by the user to execute manual correction(s) associated with the distortion(s) within a time period may be detected. In response to the user action or the failure, the distortion(s) may be automatically corrected within the digital copy 114. Moreover, the corrected digital copy 117 may be provided to the user.

The example scenarios and schemas in FIGS. 1 through 3 are shown with specific components, data types, and configurations. Embodiments are not limited to systems according to these example configurations. A mobile device to provide a medical image based distortion correction mechanism may be implemented in configurations employing fewer or additional components in applications and user interfaces. Furthermore, the example schema and components shown in FIGS. 1 through 3 and their subcomponents may be implemented in a similar manner with other values using the principles described herein.

Figure 4:
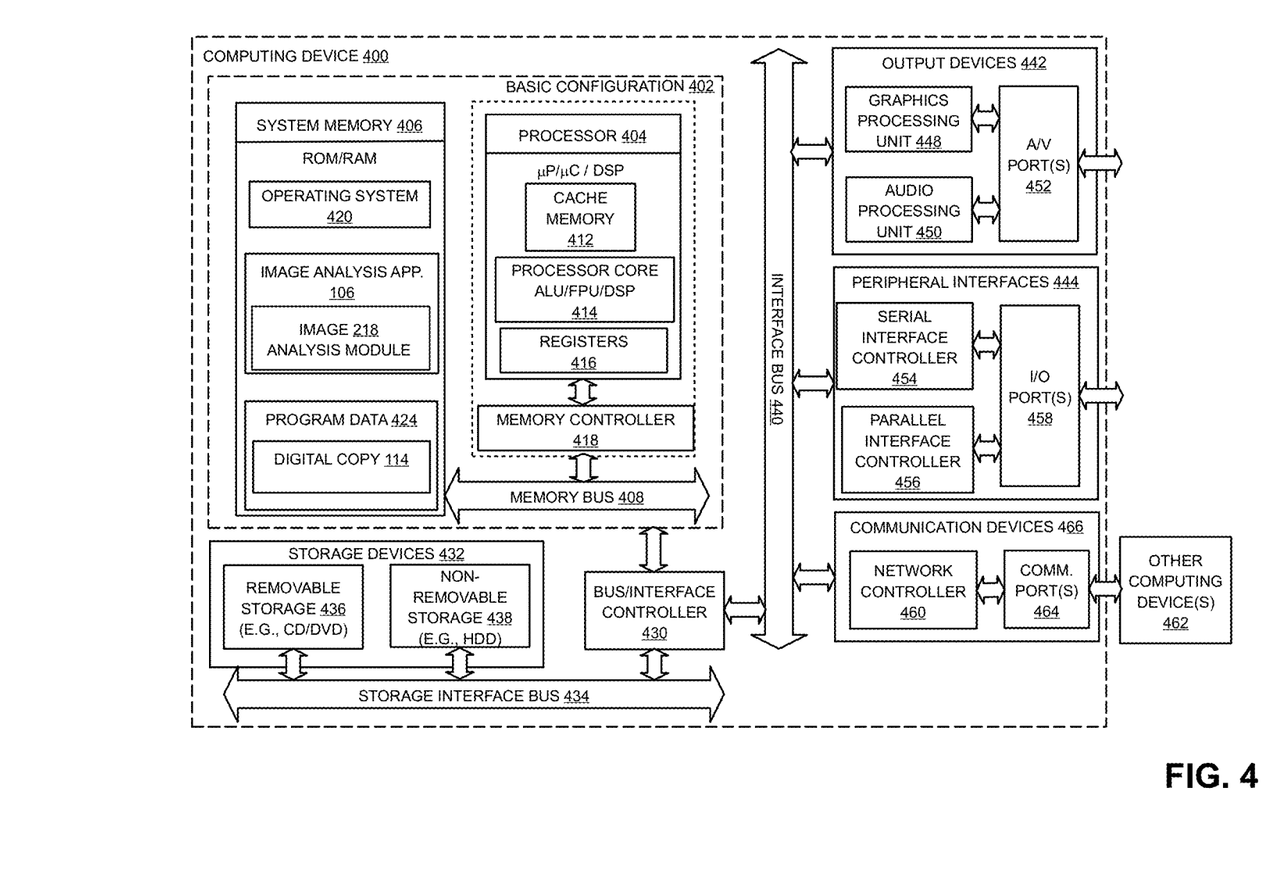
FIG. 4 is a block diagram of an example computing device, which may be used to provide a medical image based distortion correction mechanism.

FIG. 4 is a block diagram of an example computing device, which may be used to provide a medical image based distortion correction mechanism, according to embodiments. For example, computing device 400 may be used as a server, desktop computer, portable computer, smart phone, special purpose computer, or similar device. In a basic configuration 402, the computing device 400 may include one or more processors 404 and a system memory 406. A memory bus 408 may be used for communication between the processor 404 and the system memory 406. The basic configuration 402 may be illustrated in FIG. 4 by those components within the inner dashed line.

Depending on the desired configuration, the processor 404 may be of any type, including but not limited to a microprocessor (µP), a microcontroller (µC), a digital signal processor (DSP), or any combination thereof. The processor 404 may include one more levels of caching, such as a level cache memory 412, one or more processor cores 414, and registers 416. The example processor cores 414 may (each) include an arithmetic logic unit (ALU), a floating-point unit (FPU), a digital signal processing core (DSP Core), a graphics processing unit (GPU), or any combination thereof. An example memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.), or any combination thereof. The system memory 406 may include an operating system 420, the image analysis application 106, and a program data 424. The image analysis application 106 may include components such as the image analysis module 218. The image analysis module 218 may execute the instructions and processes associated with the image analysis application 106. In an example scenario, the image analysis module 218 may capture a digital copy of the medical image with a camera component in response to a user action. The medical image may be displayed by a display device. Distortion(s) associated with the digital copy may be identified by processing the digital copy with DNN model(s). A manual correction description may be determined to correct the distortion(s) in relation to the camera component and the medical image. Next, a notification to recapture the digital copy may be provided to a user. The notification may include a manual correction description. Additionally, in response to another user action to correct the distortion(s) or a failure to detect the user execute manual correction(s) associated with the distortion(s) within a time period, the distortion(s) within the digital copy may be corrected and the corrected digital copy may be provided to the user.

Input to and output out of the image analysis application 106 may be captured and displayed through a display component that may be integrated to the computing device 400. The display component may include a display screen, and/or a display monitor, among others that may capture an input through a touch/gesture based component such as a digitizer. The program data 424 may also include, among other data, the digital copy 114, or the like, as described herein. Distortion(s) in the digital copy 114 may be prevented by prompting the user to take user actions to apply instructions in a manual correction description and to recapture the digital copy 114, among other things.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example, one or more output devices 442, one or more peripheral interfaces 444, and one or more communication devices 466) to the basic configuration 402 via the bus/interface controller 430. Some of the example output devices 442 include a graphics processing unit 448 and an audio processing unit 450, which may be configured to communicate to various external devices such as a display or speakers via one or more AN ports 452. One or more example peripheral interfaces 444 may include a serial interface controller 454 or a parallel interface controller 456, which may be configured to communicate with external devices such as input devices (for example, keyboard, mouse, pen, voice input device, touch input device, etc.) or other peripheral devices (for example, printer, scanner, etc.) via one or more I/O ports 458. An example of the communication device(s) 466 includes a network controller 460, which may be arranged to facilitate communications with one or more other computing devices 462 over a network communication link via one or more communication ports 464. The one or more other computing devices 462 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a specialized server, mainframe, or similar computer, which includes any of the above functions. The computing device 400 may also be implemented as a personal computer including both laptop computer and non-laptop computer configurations. Additionally, the computing device 400 may include specialized hardware such as an application-specific integrated circuit (ASIC), a field programmable gate array (FPGA), a programmable logic device (PLD), and/or a free form logic on an integrated circuit (IC), among others.

Example embodiments may also include methods to provide a medical image based distortion correction mechanism. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 5:
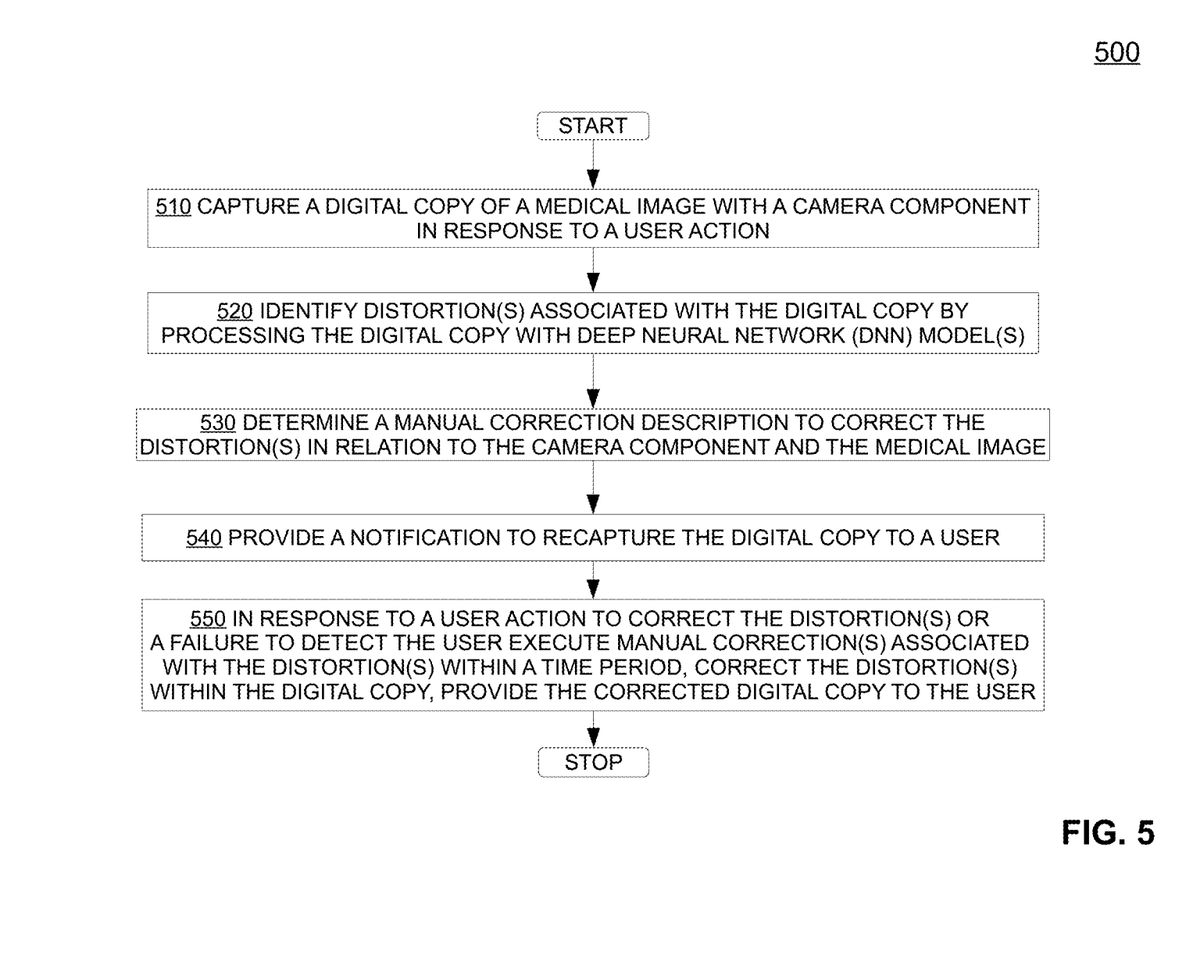
FIG. 5 is a logic flow diagram illustrating a process for providing a medical image based distortion correction mechanism, according to an embodiment of the invention.

FIG. 5 is a logic flow diagram illustrating a process for providing a medical image based distortion correction mechanism. Process 500 may be implemented on a computing device, such as the computing device 400 or another system.

Process 500 begins with operation 510, where an image analysis application may capture a digital copy of the medical image with a camera component in response to a user action. The medical image may be displayed by a display device. At operation 520, distortion(s) associated with the digital copy may be identified by processing the digital copy with DNN model(s).

At operation 530, a manual correction description may be determined to correct the distortion(s) in relation to the camera component and the medical image. Next, at operation 540, a notification to recapture the digital copy may be provided to a user. The notification may include a manual correction description. At operation 550, in response to another user action to correct the distortion(s) or a failure to detect the user execute manual correction(s) associated with the distortion(s) within a time period, the distortion(s) within the digital copy may be corrected and the corrected digital copy may be provided to the user.

The operations included in process 500 is for illustration purposes. Providing a medical image based distortion correction mechanism may be implemented by similar processes with fewer or additional steps, as well as in different order of operations using the principles described herein. The operations described herein may be executed by one or more processors operated on one or more computing devices, one or more processor cores, specialized processing devices, and/or special purpose processors, among other examples.

A method of providing a medical image based distortion correction mechanism is also described. The method includes capturing a digital copy of the medical image with a camera component. The medical image may be displayed by a display device. Next, an input image set of DNN model(s) comparable to the digital copy may be determined. The DNN model(s) may include an output image set correlated to the input image set. Variance(s) between the output image set and the digital copy may also be determined. The variance(s) may be designated as distortion(s). A manual correction description to correct the distortion(s) in relation to the camera component and the medical image may be determined. A notification to recapture the digital copy may next be provided to the user. The notification may include the manual correction description. Additionally, in response to a user action to correct the distortion(s) or a failure to detect the user execute manual correction(s) associated with the distortion(s) within a time period, the distortion(s) within the digital copy may be corrected and the corrected digital copy may be provided to the user When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A mobile device to provide a medical image based distortion correction mechanism, wherein the device is configured to:
   capture a digital copy of the medical image with a camera component in response to a first user action, wherein the medical image is displayed by a display device;
   identify one or more distortions associated with the digital copy by processing the digital copy with one or more deep neural network (DNN) models;
   determine a manual correction description to correct the one or more distortions in relation to the camera component and the medical image;
   provide a notification to recapture the digital copy to a user, wherein the notification includes the manual correction description; and
   in response to a second user action to correct the one or more distortions or a failure to detect the user execute one or more manual corrections associated with the one or more distortions within a time period,
   correct the one or more distortions within the digital copy, and
   provide the corrected digital copy to the user.

2. The mobile device of claim 1, wherein the device is further configured to:
   determine an input image set of the one or more DNN models comparable to the digital copy, wherein the one or more DNN models include an output image set correlated to the input image set;
   determine one or more variances between the output image set and the digital copy; and
   designate the one or more variances as the one or more distortions.

3. The mobile device of claim 2, wherein the output image set includes one or more distortion corrections applied to the input image set.

4. The mobile device of claim 1, wherein the device is further configured to:
   identify a glare effect within the digital copy as one of the one or more distortions; and
   determine the manual correction description associated with the glare effect, wherein the manual correction description includes a suggestion to move the camera component in relation to the display device to remove or minimize the glare effect.

5. The mobile device of claim 1, wherein the device is further configured to:
   identify a reflection effect within the digital copy as one of the one or more distortions; and
   determine the manual correction description associated with the reflection effect, wherein the manual correction description includes a suggestion to move the camera component closer or away from the display device to remove or minimize the reflection effect.

6. The mobile device of claim 1, wherein the device is further configured to:
   identify a moiré pattern within the digital copy as one of the one or more distortions; and
   determine the manual correction description associated with the moiré pattern, wherein the manual correction description includes a suggestion to adjust a focus associated with the camera component.

7. The mobile device of claim 1, wherein the device is further configured to:
   identify a geometric distortion within the digital copy as one of the one or more distortions; and
   determine the manual correction description associated with the geometric distortion, wherein the manual correction description includes a suggestion to adjust a focus associated with the camera component.

8. The mobile device of claim 1, wherein the device is further configured to:
   identify a noise within the digital copy as one of the one or more distortions; and
   determine the manual correction description associated with the noise, wherein the manual correction description includes a suggestion to adjust a lighting associated with the display device.

9. The mobile device of claim 1, wherein the device is further configured to:
   identify a light exposure issue within the digital copy as one of the one or more distortions; and
   determine the manual correction description associated with the light exposure issue, wherein the manual correction description includes a suggestion to adjust a lighting associated with the display device.

10. The mobile device of claim 1, wherein the device is further configured to:
    identify a motion blur within the digital copy as one of the one or more distortions; and
    determine the manual correction description associated with the motion blur, wherein the manual correction description includes a suggestion to steady a grip on the camera component while recapturing the digital copy.

11. A mobile device for providing a mechanism to correct a distortion in a medical image, the mobile device comprising:
    a camera component configured to capture a digital copy of the medical image in relation to the image analysis application,
    a memory configured to store instructions associated with the image analysis application,
    a processor coupled to the camera component and the memory, the processor executing the instructions associated with the image analysis application, wherein the image analysis application includes:
    an image analysis module configured to:
      capture the digital copy of the medical image with the camera component in response to a first user action, wherein the medical image is displayed by a display device;
      determine an input image set of one or more deep neural network (DNN) models comparable to the digital copy, wherein the one or more DNN models include an output image set correlated to the input image set;
      determine one or more variances between the output image set and the digital copy; and designate the one or more variances as one or more distortions;

determine a manual correction description to correct the one or more distortions in relation to the camera component and the medical image;

provide a notification to recapture the digital copy to a user, wherein the notification includes the manual correction description; and in response to a second user action to correct the one or more distortions or a failure to detect the user execute one or more manual corrections associated with the one or more distortions within a time period, correct the one or more distortions within the digital copy, and provide the corrected digital copy to the user.

12. A method of providing a mechanism to correct a distortion in a medical image, the method comprising:

capturing a digital copy of the medical image with a camera component, wherein the medical image is displayed by a display device;

determining an input image set of one or more deep neural network (DNN) models comparable to the digital copy, wherein the one or more DNN models include an output image set correlated to the input image set;

determining one or more variances between the output image set and the digital copy; and designating the one or more variances as one or more distortions;

determining a manual correction description to correct the one or more distortions in relation to the camera component and the medical image;

providing a notification to recapture the digital copy to the user, wherein the notification includes the manual correction description;

in response to a user action to correct the one or more distortions or a failure to detect the user execute one or more manual corrections associated with the one or more distortions within a time period, correcting the one or more distortions within the digital copy, and providing the corrected digital copy to the user.

* * * * *